United States Patent
Nozawa

(10) Patent No.: US 10,780,791 B2
(45) Date of Patent: Sep. 22, 2020

(54) POWER SOURCE SYSTEM FOR VEHICLE

(71) Applicant: TOYOTA JIDOSHA KABUSHIKI KAISHA, Toyota-shi, Aichi (JP)

(72) Inventor: Takashi Nozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 86 days.

(21) Appl. No.: 16/165,227

(22) Filed: Oct. 19, 2018

(65) Prior Publication Data
US 2019/0135121 A1    May 9, 2019

(30) Foreign Application Priority Data
Nov. 8, 2017  (JP) .................... 2017-215719

(51) Int. Cl.
| | | |
|---|---|---|
| B60L 53/24 | (2019.01) | |
| H02M 3/158 | (2006.01) | |
| H02M 1/36 | (2007.01) | |
| H02P 27/06 | (2006.01) | |

(52) U.S. Cl.
CPC ............ B60L 53/24 (2019.02); H02M 1/36 (2013.01); H02M 3/158 (2013.01); *B60L 2210/14* (2013.01); *H02P 27/06* (2013.01)

(58) Field of Classification Search
CPC ...... B60L 53/24; B60L 2210/14; H02M 1/36; H02M 3/158; H02P 27/06
See application file for complete search history.

(56) References Cited

U.S. PATENT DOCUMENTS

| | | | | |
|---|---|---|---|---|
| 2014/0203759 A1* | 7/2014 | Sugiyama | ............... | B60L 1/003 320/104 |
| 2015/0298571 A1* | 10/2015 | Kim | ........................ | B60L 58/20 701/22 |
| 2018/0037178 A1* | 2/2018 | Richardson | ........... | B60R 16/033 |

FOREIGN PATENT DOCUMENTS

| | | |
|---|---|---|
| JP | 2016-135010 A | 7/2016 |
| JP | 2017-085810 A | 5/2017 |

* cited by examiner

*Primary Examiner* — Rexford N Barnie
*Assistant Examiner* — Kalu Kelly Emeaba
(74) *Attorney, Agent, or Firm* — Oliff PLC

(57) ABSTRACT

A power source system may include a main power source, a power converter including a capacitor, a relay configured to switch between connection and disconnection between the power converter and the main power source, an auxiliary power source, a boost converter having a low voltage terminal thereof connected to the auxiliary power source, and having a high voltage terminal thereof connected to the power converter without interposing the relay, and a controller configured to pre-charge the capacitor prior to placing the relay in a connected state. During the pre-charging of the capacitor, the controller may be configured to set an output current of the boost converter to a first current value while a specific auxiliary device connected to the auxiliary power source executes a specific process, and change the output current to a second current value larger than the first current value after the execution is completed.

1 Claim, 3 Drawing Sheets

POWER SOURCE SYSTEM FOR VEHICLE

CROSS-REFERENCE TO RELATED APPLICATION

This application claims priority to Japanese Patent Application No. 2017-215719 filed on Nov. 8, 2017, the contents of which are hereby incorporated by reference into the present application.

TECHNICAL FIELD

The technology disclosed herein relates to a power source system for a vehicle, and particularly relates to a power source system for a vehicle that includes a high voltage power source for a traction motor and a low voltage power source for an auxiliary device.

BACKGROUND

An electric vehicle (including a fuel-cell vehicle and a hybrid vehicle) includes a high voltage power source (a main power source) for a traction motor and a low voltage power source (an auxiliary power source) for an auxiliary device. The "auxiliary device" is a generic term for vehicle-mounted devices that have an operating voltage lower than a voltage of the traction motor. The operating voltage of the vehicle-mounted devices is equal to or lower than approximately 50 volts. The traction motor has a driving voltage higher than 100 volts, and the main power source has an output voltage exceeding 100 volts. In other words, the auxiliary power source has an output voltage lower than the output voltage of the main power source. Typical examples of the main power source are a lithium-ion battery and a fuel cell. A secondary battery, which is rechargeable, is adopted as the auxiliary power source. A typical example of the auxiliary power source is a lead battery. Japanese Patent Application Publication No. 2017-085810 and Japanese Patent Application Publication No. 2016-135010 illustrate such power source systems.

The main power source is connected to a power converter via a system main relay. The power converter converts power from the main power source into driving power of the traction motor. The power converter includes a capacitor connected between a positive electrode and a negative electrode of the main power source. The capacitor is provided for smoothing a current supplied from the main power source or for temporarily storing power energy in a chopper-type voltage converter. When the system main relay is closed and the power converter is connected to the high voltage power source at turn-on of a main switch of the vehicle, a large current flows into the capacitor through the system main relay. The surge of the large current may cause contact melting in the system main relay. In this respect, in the power source system in each of Japanese Patent Application Publication No. 2017-085810 and Japanese Patent Application. Publication No. 2016-135010, the capacitor is charged by using an auxiliary battery prior to switching the system main relay to a connected state. Charging the capacitor before switching the system main relay to the connected state is referred to as pre-charging.

The power source system in each of Japanese Patent Application Publication No. 2017-085810 and Japanese Patent Application Publication No. 2016-135010 includes a boost converter having a low voltage terminal thereof connected to the auxiliary power source and a high voltage terminal thereof connected to the power converter without interposing the system main relay. A controller of the power source system pre-charges the capacitor with power from the auxiliary power source by operating the boost converter prior to switching the system main relay to the connected state.

To ensure execution of the pre-charging even in a case where a remaining amount in the auxiliary power source is small, the power source system in Japanese Patent Application Publication No. 2016-135010 activates only an auxiliary device required for the pre-charging, while prohibiting activation of another auxiliary device.

SUMMARY

An auxiliary power source supplies power to various auxiliary devices. An air conditioner, a room lamp, a car navigation system as well as various kinds of controllers including a controller of a power source system belong to auxiliary devices, and are supplied with power from the auxiliary power source. When a main switch of a vehicle is turned on, some of the auxiliary devices execute their initializing processes at activation. If consumption power of the other auxiliary devices increases during the pre-charging, power from the auxiliary power source may become insufficient, which may result in unstable operations of the other auxiliary devices. The disclosure herein provides a technology capable of stably executing pre-charging by using an auxiliary power source to which various auxiliary devices are connected.

A power source system for a vehicle disclosed herein may comprise a main power source, an auxiliary power source, a power converter, a relay, a boost converter, and a controller. The power converter may be configured to convert an output power from the main power source and include a capacitor connected between a positive electrode and a negative electrode of the main power source. The relay may be configured to switch between connection and disconnection between the power converter and the main power source. The auxiliary power source may have an output voltage lower than an output voltage of the main power source. The boost converter may have a low voltage terminal thereof connected to the auxiliary power source and have a high voltage terminal thereof connected to the power converter without interposing the relay. The controller may be configured to pre-charge the capacitor by activating the boost converter prior to placing the relay in a connected state. During the pre-charging of the capacitor, the controller may be configured to set an output current of the boost converter to a first current value while a specific auxiliary device connected to the auxiliary power source executes a specific process (e.g., initializing process), and to change the output current to a second current value larger than the first current value after the execution of the specific process is completed.

As mentioned above, the specific auxiliary device supplied with power from the auxiliary power source executes an initializing process and the like. In the power source system disclosed herein, the output current of the boost converter is set to be small while the specific process such as the initializing process is executed, and the output current is set to be large after the execution of the specific process is completed. During the execution of the specific process, the power supplied from the auxiliary power source to the boost converter is reduced such that output from the auxiliary power source does not become insufficient. The power source system disclosed herein can stably execute the pre-charging even while the specific auxiliary device executes the specific process.

Details and further improvements of the technology disclosed herein will be described in "DETAILED DESCRIPTION" below.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved power source system for a vehicle, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
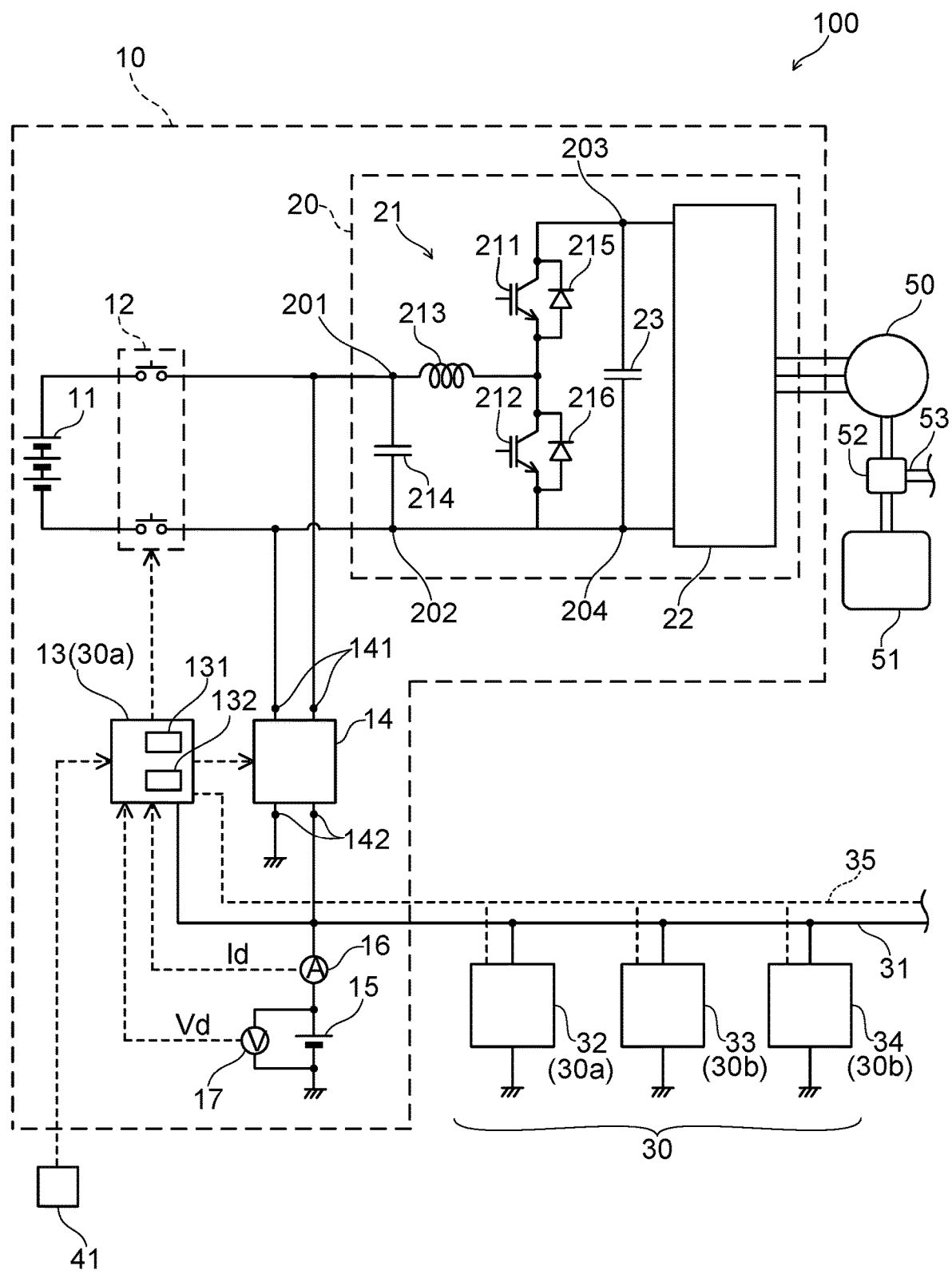
FIG. 1 is a block diagram of a power system of a hybrid vehicle that includes a power source system of an embodiment.

With reference to the drawings, a power source system 10 of an embodiment will be described. The power source system 10 of the embodiment is mounted on a hybrid vehicle 100. FIG. 1 illustrates a block diagram of a power system of the hybrid vehicle 100 that includes the power source system 10. The hybrid vehicle 100 includes a traction motor 50 and an engine 51. An output torque of the traction motor 50 and an output torque of the engine 51 are combined at a gear set 52 and transferred to an axle 53.

The hybrid vehicle 100 includes a main switch 41, an engine controller 32, an air conditioner 33, and a car navigation system 34, in addition to the power source system 10, the traction motor 50, and the engine 51. The engine controller 32, the air conditioner 33, and the car navigation system 34 are supplied with power from an auxiliary battery 15 through an auxiliary power line 31. A controller 13 included in the power source system 10 is also supplied with power from the auxiliary battery 15, which will be described in detail later. Devices supplied with power from the auxiliary battery 15 are collectively called "auxiliary devices". Hereinbelow, auxiliary devices such as the engine controller 32, the air conditioner 33, the car navigation system 34, and the controller 13 may be collectively called auxiliary devices 30. The auxiliary devices 30 are classified into special auxiliary devices 30a and normal auxiliary devices 30b. The classification will be described later.

The power source system 10 is a system that supplies power to the traction motor 50 and the auxiliary devices 30. The power source system 10 includes a main battery 11, the auxiliary battery 15, a system main relay 12, a power converter 20, a boost converter 14, and the controller 13.

The main battery 11 is a power source mainly for the traction motor 50. The main battery 11 is, for example, a rechargeable lithium-ion battery. The main battery 11 has an output voltage of, for example, 200 volts.

As mentioned above, the auxiliary battery 15 is a power source for supplying power to the auxiliary devices 30. The auxiliary battery 15 has an output voltage that is lower than the output voltage of the main battery 11, and the output voltage of the auxiliary battery 15 is, for example, 12 volts, 24 volts, or 48 volts. The auxiliary battery 15 is also a secondary battery, which is rechargeable, and is, for example, a lead battery. The auxiliary battery 15 supplies power to a large number of auxiliary devices, which are not illustrated, via the auxiliary power line 31 that runs throughout the vehicle. A negative electrode of the auxiliary battery 15 and negative electrodes of the auxiliary devices 30 are connected via a ground. In an auxiliary power system, a body of the vehicle corresponds to a ground terminal.

The power converter 20 is connected to the main battery 11 via the system main relay 12. The power converter 20 converts output power from the main battery 11 into driving power of the traction motor 50. The power converter 20 includes a bidirectional DC-DC converter circuit 21, an inverter circuit 22, and a capacitor 23. The traction motor 50 has a driving voltage between 200 volts and 600 volts. If a driving voltage target of the traction motor 50 is higher than the output voltage of the main battery 11, the bidirectional DC-DC converter circuit 21 boosts the output voltage of the main battery 11 to the driving voltage of the traction motor 50. The inverter circuit 22 converts the boosted direct-current power into alternating-current power for driving the traction motor 50. For convenience of description, the bidirectional DC-DC converter circuit 21 will hereinafter simply be referred to as the bidirectional converter circuit 21.

The traction motor 50 generates power by utilizing an inertial force of the vehicle when a driver presses a brake pedal. The power generated by the traction motor 50 is referred to as regenerative power. The inverter circuit 22 can also convert alternating-current regenerative power into direct-current power, and transmit it to the bidirectional converter circuit 21. The bidirectional converter circuit 21 steps down the regenerative power, which has been converted into the direct-current power, to the voltage of the main battery 11. The main battery 11 is charged with the stepped-down regenerative power.

A circuit configuration of the bidirectional converter circuit 21 will be described. The bidirectional converter circuit 21 is constituted of two transistors 211, 212, two diodes 215, 216, a reactor 213, and a capacitor 214. The two transistors 211, 212 are connected in series between inverter-side terminals (a positive electrode terminal 203 and a negative electrode terminal 204) of the bidirectional converter circuit 21. The diode 215 is connected in inverse parallel with the transistor 211, and the diode 216 is connected in inverse parallel with the transistor 212. The diodes 215, 216 are provided for allowing a current to flow by bypassing the transistors 211, 212 when they are in an off state.

The reactor 213 has one end thereof connected to a midpoint of the series connection of the transistors 211, 212, and has another end thereof connected to a battery-side positive electrode terminal 201 of the bidirectional converter circuit 21. The capacitor 214 is connected between the battery-side positive electrode terminal 201 and a battery-side negative electrode terminal 202 of the bidirectional converter circuit 21. The battery-side negative electrode terminal 202 and the inverter-side negative electrode terminal 204 of the bidirectional converter circuit 21 are directly connected.

The transistor 211 on positive electrode's side of the series connection is mainly involved in a stepping-down operation, while the transistor 212 on negative electrode's side of the series connection is mainly involved in a boosting operation. The circuit configuration and operation of the bidirectional converter circuit 21 in FIG. 1 are well known, so detailed description thereof will be omitted.

The capacitor 214 serves to temporarily store electric energy in the bidirectional converter circuit 21. The capacitor 23 that smooths a current transmitted from the main battery 11 is connected in parallel between the bidirectional converter circuit 21 and the inverter circuit 22. As illustrated in FIG. 1, the capacitors 214, 23 are connected between a positive electrode and a negative electrode of the main battery 11 via the system main relay 12.

The system main relay 12 is a switch that switches between connection and disconnection between the power converter 20 and the main battery 11. The system main relay 12 is controlled by the controller 13 of the power source system 10. When the main switch 41 of the vehicle is turned on, the controller 13 closes the system main relay 12 after pre-charging of the capacitors 214, 23 (to be described later) and connects the power converter 20 to the main battery 11. Dotted-line arrows in FIG. 1 represent signal lines. The auxiliary devices 30, such as the controller 13 of the power source system 10, the engine controller 32, the air conditioner 33, and the car navigation system 34, are capable of communicating with each other by an in-vehicle network 35.

The boost converter 14 has a low voltage terminal 142 thereof connected to the auxiliary battery 15 and a high voltage terminal 141 thereof connected to the power converter 20 on a side closer to the power converter 20 relative to the system main relay 12. In other words, the high voltage terminal 141 of the boost converter 14 is connected to the power converter 20 without interposing the system main relay 12. The boost converter 14 can boost the output voltage of the auxiliary battery 15 and supply it to the power converter 20 (the capacitors 214, 23).

The controller 13 controls the system main relay 12 and the boost converter 14. The controller 13 includes a CPU 131 and a memory 132, and can execute various processes by the CPU 131 executing a program stored in the memory 132. The power source system 10 includes a voltage sensor 17 that measures a voltage of the auxiliary battery 15 and a current sensor 16 that measures a current of the auxiliary battery 15. Data of these sensors is sent to the controller 13. Although not illustrated, a voltage sensor is also connected between the battery-side positive electrode terminal 201 and the battery-side negative electrode terminal 202 of the bidirectional converter circuit 21, and measurement data of this voltage sensor is also sent to the controller 13. The voltage sensor between the positive electrode terminal 201 and the negative electrode terminal 202 measures a voltage across each of the capacitors 214, 23 in a pre-charging process to be described later.

As is understood from the block diagram in FIG. 1, when the system main relay 12 is switched from an open state (open) to a connected state (close), the power converter 20 is connected to the main battery 11, and a current of the main battery 11 flows into the capacitors 214, 23 of the power converter 20. Even when the transistor 211 is off, the current of the main battery 11 flows into the capacitor 23 through the diode 215. When the system main relay 12 is closed in a state where the capacitors 214, 23 are completely discharged, the current of the main battery 11 suddenly flows into the capacitors 214, 23 through the system main relay 12. The flow of large current through the system main relay 12 may cause contact melting of the system main relay 12. Thus, when the main switch 41 is turned on, the controller 13 charges the capacitors 214, 23 in advance by using the auxiliary battery 15 and the boost converter 14 prior to switching the system main relay 12 from the open state to the connected state. Charging the capacitors 214, 23 before closing the system main relay 12 is referred to as pre-charging.

Charging the capacitors 214, 23 requires an appropriate amount of power. Moreover, after the turn-on of the main switch 41 of the vehicle, the system main relay 12 cannot be switched to the connected state unless the pre-charging has been completed. It is therefore desirable that the pre-charging is achieved as quickly as possible.

Meanwhile, when the main switch 41 of the vehicle is turned on, some of the auxiliary devices in the vehicle execute their initializing processes at activation. The auxiliary devices operate by being supplied with power from the auxiliary battery 15. For example, the engine controller 32 checks its own circuit and checks whether an injector device and the like of the engine 51 are energized, as its initializing process at activation. In addition, an electric-powered shift device, which belongs to the auxiliary devices, operates an actuator that moves a shift lever for zero-point reset of a shift position. Moreover, an electronically controlled brake device, which belongs to the auxiliary devices, accumulates a reserve pressure in an accumulator.

Some of the auxiliary devices may be prohibited from operating, for a certain period after the turn-on of the main switch of the vehicle. The auxiliary devices whose operations may be prohibited will hereinafter be referred to as normal auxiliary devices. On the other hand, some other auxiliary devices, such as the engine controller 32, the electric-powered shift device, and the electronically controlled brake device described above, cannot be prohibited from operating. The auxiliary devices whose operations cannot be prohibited will hereinafter be referred to as special auxiliary devices. The special auxiliary devices will hereinafter be referred to as the special auxiliary devices 30a. The controller 13 of the power source system 10 also belongs to the special auxiliary devices 30a. Examples of the normal auxiliary devices are the air conditioner 33, the car navigation system 34, and the like. The normal auxiliary devices will hereinafter be referred to as the normal auxiliary devices 30b. Some of the special auxiliary devices 30a may not require their initializing processes. Some of the normal auxiliary devices 30b may execute their initializing processes after the operation prohibition has been cancelled. Moreover, there may be another auxiliary device that cannot be categorized as the special auxiliary devices 30a or as the normal auxiliary devices 30b.

If consumption current of the auxiliary devices 30 increases during the pre-charging, power from the auxiliary battery 15 may become insufficient, which may result in unstable operation of the boost converter 14 that executes the pre-charging or unstable operations of the auxiliary devices 30. Thus, the controller 13 of the power source system 10 of the embodiment prohibits operations of the normal auxiliary devices 30b during the pre-charging. Moreover, the controller 13 reduces a current for the pre-charging (i.e., an output current of the boost converter 14) while the initializing processes of the special auxiliary devices 30a are executed.

Figure 2:
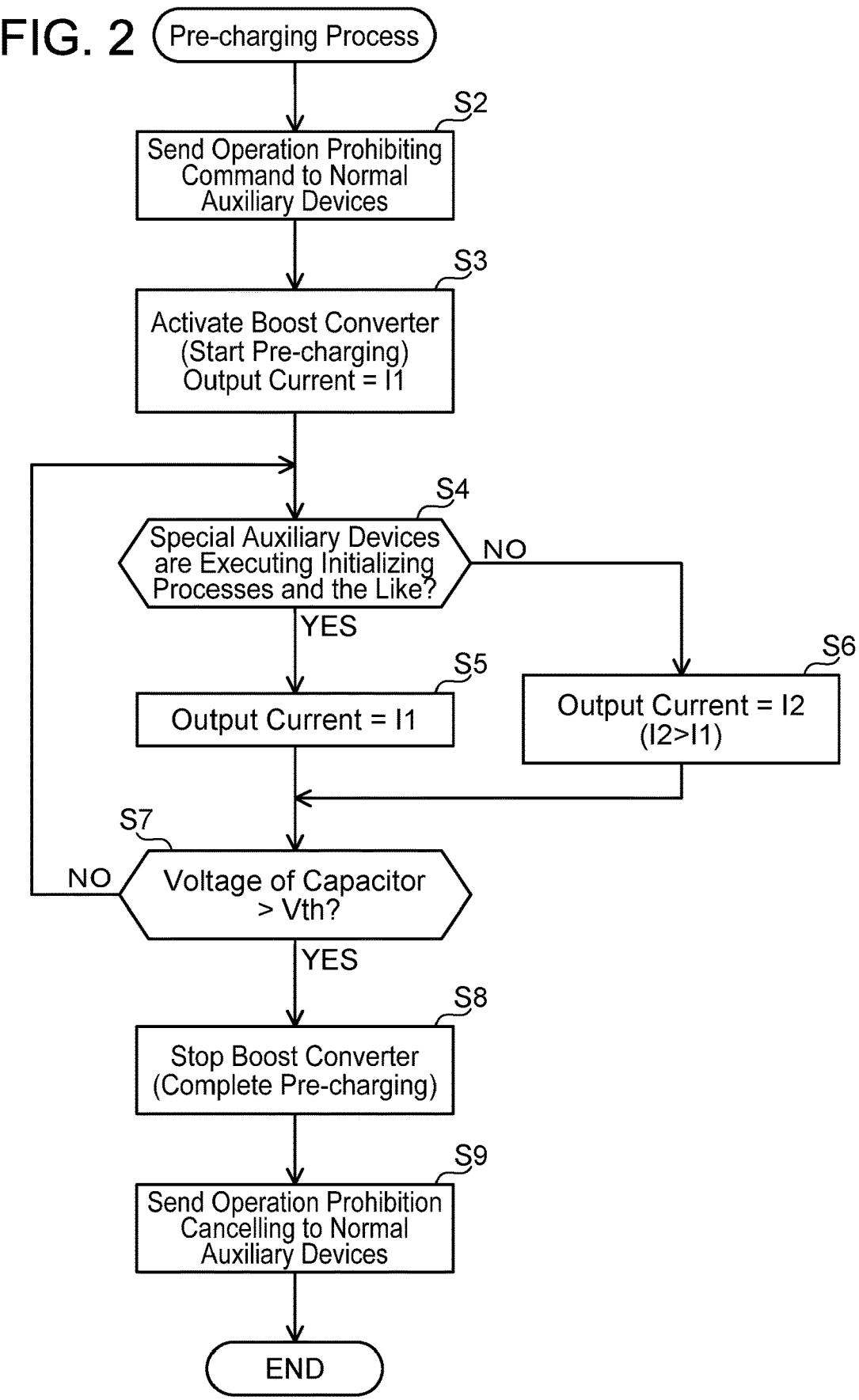
FIG. 2 is a flow chart of a pre-charging process executed by a controller.

With reference to FIG. 2, the pre-charging process executed by the controller 13 will be described. FIG. 2 is a flow chart of the pre-charging process. The process in FIG. 2 is started when the main switch 41 of the vehicle is turned on. Before starting the pre-charging, the controller 13 sends a command for prohibiting an operation (hereinafter referred to as "operation prohibiting command") to the normal auxiliary devices 30b (step S2). The controller 13 sends the command to the normal auxiliary devices 30b through the in-vehicle network 35. The normal auxiliary devices 30b that have received the operation prohibiting command prohibit their operations until receiving from the controller 13 a command for cancelling the prohibition on the operation (hereinafter referred to as "operation prohibition cancelling command"). It should be noted that each of the normal auxiliary devices 30b executes a minimum process which is communication processing through the in-vehicle network 35, whenever necessary. The term "prohibition on the operation (operation prohibition)" herein means prohibition on execution of a unique process that each of the normal auxiliary devices 30b is originally intended to execute.

Next, the controller 13 starts the pre-charging by activating the boost converter 14 (step S3). The controller 13 sends to the boost converter 14 a command for setting its output current to a first current value I1.

During the execution of the pre-charging, the controller 13 communicates with the special auxiliary devices 30a to check whether or not the special auxiliary devices 30a are executing a special process such as their initializing processes and the like (step S4). If some (or all) of the special auxiliary devices 30a are executing the initializing processes and the like, the controller 13 sends to the boost converter 14 a command for setting the output current to the first current value I1 (step S4: YES, step S5). If the previous command was the command for setting the output current to the first/second current value I1, the controller 13 may not send this new command. On the other hand, if some (or all) of the special auxiliary devices 30a are not executing the initializing processes and the like, the controller 13 sends to the boost converter 14 a command for setting the output current to a second current value I2 (step S4: NO, step S6). If the previous command was the command for setting the output current to the first/second current value I2, the controller 13 may not issue this new command. The second current value I2 is set to a value larger than the first current value I1. Specific examples of the first current value I1 and the second current value I2 will be described later.

The controller 13 repeats the process of step S4 at regular intervals (step S7: NO, step S4) until a voltage of each of the capacitors 214, 23 reaches a predetermined voltage threshold Vth. It is desirable that the voltage threshold Vth is close to the output voltage of the main battery 11, and the voltage threshold Vth is set to 70% to 95% of the voltage of the main battery 11, for example. As mentioned above, the voltage sensor is connected between the positive electrode terminal 201 and the negative electrode terminal 202 of the bidirectional converter circuit 21, and the controller 13 acquires the voltage of each of the capacitors 214, 23 from this voltage sensor.

When the voltage of each of the capacitors 214, 23 reaches the predetermined voltage threshold Vth, the controller 13 stops the boost converter 14 and completes the pre-charging (step S7: YES, step S8). The controller 13 sends the operation prohibition cancelling command to the normal auxiliary devices 30b to which the operation prohibiting command was sent previously (step S9). The operation prohibition cancelling command is also sent through the in-vehicle network 35. The pre-charging process is hereby completed.

After completing the pre-charging process, the controller 13 closes the system main relay 12 and connects the power converter 20 to the main battery 11. When the power converter 20 is connected to the main battery 11, the hybrid vehicle 100 becomes ready to travel.

Since the capacitors 214, 23 are pre-charged by the pre-charging, no large inrush current flows when the system main relay 12 is closed.

While the special auxiliary devices 30a execute their initializing processes and the like, the controller 13 reduces the output current of the boost converter 14 (i.e., a consumption current of the boost converter 14) to the first current value I1. While the special auxiliary devices 30a do not execute their initializing processes and the like, the controller 13 increases the output current of the boost converter 14 (i.e., the consumption current of the boost converter 14) from the first current value I1 to the second current value I2 (I2>I1). The power source system 10 of the embodiment can execute the pre-charging stably even while the special auxiliary devices 30a execute the specific process such as the initializing processes. Moreover, when the special auxiliary devices 30a are not executing the specific process, the controller 13 increases the output current of the boost converter 14 (i.e., a current for pre-charging the capacitors 214, 23). By increasing the output current, time required for the pre-charging is decreased. Furthermore, while the special auxiliary devices 30a do not execute the specific process, the controller 13 prohibits the normal auxiliary devices 30b from operating. Due to this, the normal auxiliary devices 30b are not unexpectedly activated even when the output current of the boost converter 14 is increased, which does not result in shortage of power from the auxiliary battery 15. The power source system 10 of the embodiment can execute the pre-charging stably by using the auxiliary battery 15 to which the various auxiliary devices 30 are connected, and in addition, can decrease the time required for the pre-charging.

Figure 3:
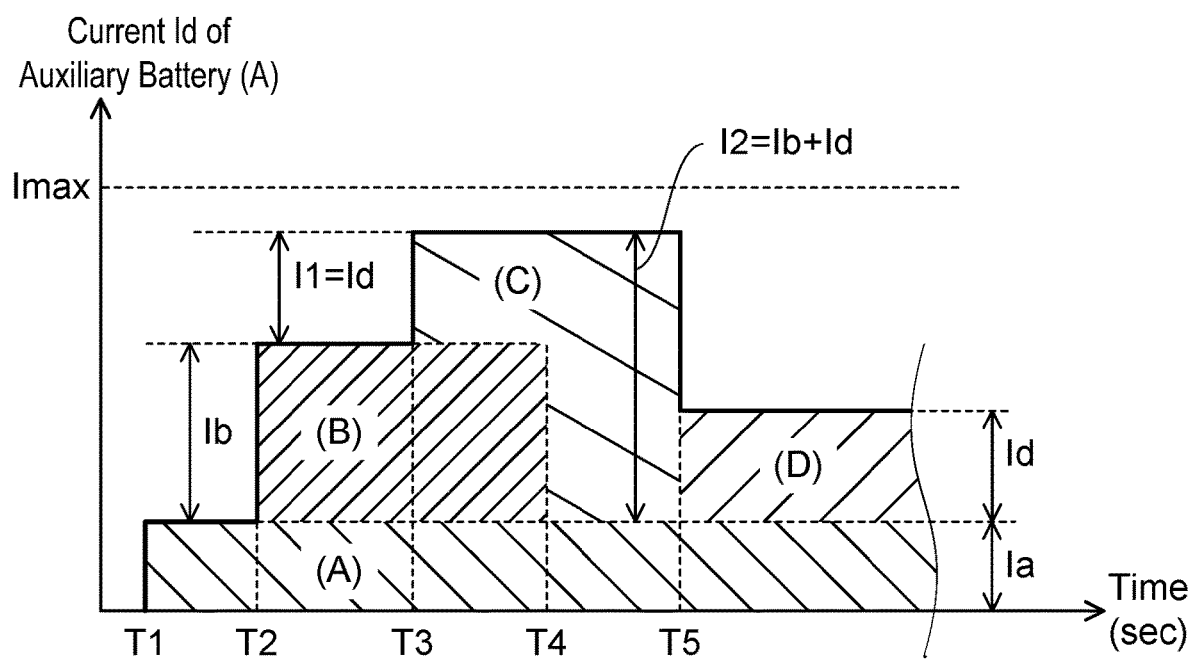
FIG. 3 is a time chart illustrating an example of chronological changes in a current of an auxiliary battery.

FIG. 3 illustrates an example of chronological changes in the current of the auxiliary battery 15 at the pre-charging. In a graph of FIG. 3, an abscissa axis represents time and an ordinate axis represents a current Ibt of the auxiliary battery 15. At a time T1, the main switch 41 of the vehicle is turned on, and some of the special auxiliary devices 30a are activated. A hatched region (A) in FIG. 3 represents a consumption current amount of the special auxiliary devices 30a in a steady state. The consumption current of the special auxiliary devices 30a in the steady state takes a current value Ia.

Some (or all) of the special auxiliary devices 30a execute their initializing processes at a time T2. A hatched region (B) in FIG. 3 represents a consumption current amount required for the initializing processes. The consumption current required for the initializing processes of the special auxiliary devices 30a takes a current value Ib.

The controller 13 starts the pre-charging at a time T3. A hatched region (C) in FIG. 3 represents an output current amount of the boost converter 14. The output current of the boost converter 14 is a current to be supplied to the capacitors 214, 23. Moreover, the output current of the boost converter 14 is approximately equal to a consumption power of the boost converter 14. The output current of the boost converter 14 takes the first current value I1 until a time T4 at which the initializing processes of the special auxiliary devices 30a are completed and takes the second current value I2 from the time T4 to a time T5 at which the pre-charging is completed.

The controller 13 prohibits the normal auxiliary devices 30b from operating until the pre-charging is completed (step 52 in FIG. 2). When the pre-charging is completed, the controller 13 sends to the normal auxiliary devices 30b the operation prohibition cancelling command (step 89). In the case of FIG. 3, the controller 13 sends the operation prohibition cancelling command to the normal auxiliary devices 30b at the time T5. The normal auxiliary devices 30b that have received the operation prohibition cancelling command are activated at the time T5. A hatched region (D) in FIG. 3 represents a consumption current amount of the normal auxiliary devices 30b in a steady state. The consumption current of the normal auxiliary devices 30b in the steady state takes a current value Id.

A current value Imax on the ordinate axis in FIG. 3 means an output upper limit value of the auxiliary battery 15. In the case of an example in FIG. 3, the output current of the boost converter 14 is set to the first current value I1 while the special auxiliary devices 30a execute the initializing processes. The first current value I1 is set to a small value such that consumption current of all of the operating auxiliary devices does not exceed the output upper limit value Imax of the auxiliary battery 15. In the case of the embodiment, the first current value I1 is set to a value equal to the consumption current Id of the normal auxiliary devices 30b to which the operation prohibition is notified. It should be noted that the first current value I1 may be set to a value obtained by adding an allowable value, such as an error, to the consumption current Id of the normal auxiliary devices 30b to which the operation prohibition is notified. In this sense, the first current value I1 may be set to a value corresponding to the consumption current Id of the normal auxiliary devices 30b to which the operation prohibition is notified.

When the initializing processes of the special auxiliary devices 30a are completed during the pre-charging, the controller 13 increases the output current of the boost converter 14 from the first current value I1 to the second current value I2. In the case of the example in FIG. 3, the second current value I2 is set to a value obtained by adding the current value Ib required for the initializing processes of the special auxiliary devices 30a to the consumption current Id of the normal auxiliary devices 30b that received the operation prohibiting command. The second current value I2 may also be set to a value obtained by adding the current value Ib and an allowable error to the consumption current Id. In this sense, the second current value may be set to a value corresponding to a sum of the consumption current Id and the current value Ib.

By setting values as described above, a largest current possible can be supplied to the capacitors 214, 23 without having a total consumption current of the auxiliary devices 30 exceed the output upper limit value Imax of the auxiliary battery 15 during the pre-charging.

The power source system 10 described in the embodiment has features as follows. The power source system 10 includes the main battery 11, the power converter 20, the system main relay 12, the auxiliary battery 15, the boost converter 14, and the controller 13. The power converter 20 includes the capacitors 214, 23 connected to the main battery 11 via the system main relay 12. The boost converter 14 has the low voltage terminal 142 thereof connected to the auxiliary battery 15 and the high voltage terminal 141 thereof connected to the power converter 20 without interposing the system main relay 12. In other words, the high voltage terminal 141 of the boost converter 14 is connected to the capacitors 214, 23 of the power converter 20 without interposing the system main relay 12.

When the main switch 41 of the vehicle is turned on, the controller 13 pre-charges the capacitors 214, 23 by activating the boost converter 14 prior to closing the system main relay 12 and connecting the power converter 20 to the main battery 11. During the pre-charging of the capacitors 214, 23, the controller 13 sets the output current of the boost converter 14 to the first current value I1 while the special auxiliary devices 30a connected to the auxiliary battery 15 execute the specific process (the initializing processes and the like). The controller 13 changes the output current of the boost converter 14 to the second current value I2 larger than the first current value I1 after the execution of the specific process above is completed.

The controller 13 may be configured to send to the normal auxiliary devices 30b the command for prohibiting their operations during the pre-charging of the capacitors 214, 23. In this case, the first current value I1 may be set to the value corresponding to the consumption current Id of the normal auxiliary devices 30b, and the second current value I2 may be set to the value corresponding to the sum of the consumption current Id of the normal auxiliary devices 30b and the consumption current Ib required for the specific process (the initializing processes and the like) of the special auxiliary devices 30a. By setting the first current value I1 and the second current value I2 as described above, the pre-charging can be completed quickly without having the current of the auxiliary battery 15 exceed the output upper limit value during the pre-charging. The first current value I1 and the second current value I2 can be set as described above, but the first current value I1 may be equal to or smaller than the consumption current Id of the normal auxiliary devices 30b. The second current value I2 may be equal to or smaller than the sum of the consumption current Ib and the consumption current Id.

Points to be noted relating to the technology described in the embodiment will be described. The main battery 11 corresponds to an example of main power source. The main power source may be a fuel cell. The auxiliary battery 15 corresponds to an example of auxiliary power source. The special auxiliary device 30a is an example of "specific auxiliary device", and the normal auxiliary device 30b corresponds to an example of "another auxiliary device". The "specific auxiliary device" may include at least one auxiliary device. The special auxiliary devices 30a may be limited to auxiliary device(s) whose current required for the specific process executed at activation, such as the initializing process, will possibly become larger than a predetermined current threshold. The "another auxiliary device" may include at least one auxiliary device.

The boost converter 14 may be a bidirectional DC-DC converter. In this case, it is possible to charge the auxiliary battery 15 by switching the system main relay 12 to the connected state and then stepping down the power of the main battery 11.

The pre-charging process described in the embodiment may be executed by a plurality of computers that are capable of communicating with each other by an in-vehicle network. In other words, an actual configuration of the controller 13 described in the embodiment may be a plurality of computers connected to be able to communicate with each other by a network.

The vehicle in the embodiment is the hybrid vehicle that includes the traction motor 50 and the engine 51. The power source system for a vehicle disclosed herein can also be applied to a fuel-cell vehicle and an electric vehicle that include no engine.

While specific examples of the present invention have been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present invention is not limited to the combinations described at the time the claims are filed. Further, the purpose of the examples illustrated by the present description or drawings is to satisfy multiple objectives simultaneously, and satisfying any one of those objectives gives technical utility to the present invention.

What is claimed is:

1. A power source system for a vehicle comprising:
a main power source;
a power converter configured to convert an output power from the main power source, the power converter including a capacitor connected between a positive electrode and a negative electrode of the main power source;
a relay configured to switch between connection and disconnection between the power converter and the main power source;
an auxiliary power source having an output voltage lower than an output voltage of the main power source;
a boost converter having a low voltage terminal thereof connected to the auxiliary power source, the boost converter having a high voltage terminal thereof connected to the power converter without interposing the relay; and
a controller configured to:
pre-charge the capacitor by activating the boost converter prior to placing the relay in a connected state; and
send a command for prohibiting an operation of another auxiliary device during the pre-charging of the capacitor to the other auxiliary device, wherein
during the pre-charging of the capacitor, the controller is configured to:
set an output current of the boost converter to a first current value while a specific auxiliary device connected to the auxiliary power source executes a specific process; and
change the output current to a second current value larger than the first current value after the execution of the specific process is completed, and
the first current value is set to a value corresponding to a consumption current of the other auxiliary device, and
the second current value is set to a value corresponding to a sum of the consumption current of the other auxiliary device and a consumption current required for the specific process.

\* \* \* \* \*